(12) United States Patent
Magnin

(10) Patent No.: US 11,840,027 B2
(45) Date of Patent: Dec. 12, 2023

(54) DEVICE AND METHOD FOR SHAPING A BLANK FOR THE FORMATION OF A STRUCTURAL THERMOPLASTIC PART

(71) Applicant: Stelia Aerospace, Rochefort (FR)

(72) Inventor: Pierre Magnin, Balma (FR)

(73) Assignee: AIRBUS ATLANTIC, Rochefort (FR)

( * ) Notice: Subject to any disclaimer, the term of this patent is extended or adjusted under 35 U.S.C. 154(b) by 0 days.

(21) Appl. No.: 17/054,009

(22) PCT Filed: May 22, 2019

(86) PCT No.: PCT/EP2019/063261
§ 371 (c)(1),
(2) Date: Nov. 9, 2020

(87) PCT Pub. No.: WO2019/228893
PCT Pub. Date: Dec. 5, 2019

(65) Prior Publication Data
US 2021/0237376 A1    Aug. 5, 2021

(30) Foreign Application Priority Data

May 28, 2018 (FR) ...................................... 1854476

(51) Int. Cl.
*B29C 70/50* (2006.01)
*B29C 53/84* (2006.01)
(Continued)

(52) U.S. Cl.
CPC ............ *B29C 70/506* (2013.01); *B29C 53/84* (2013.01); *B29D 99/0003* (2013.01);
(Continued)

(58) Field of Classification Search
CPC ... B29C 70/506; B29C 70/085; B29C 70/504; B29C 53/84; B29C 70/465;
(Continued)

(56) References Cited

U.S. PATENT DOCUMENTS 2,822,575 A    2/1958    Imbert et al.
4,133,711 A    1/1979    August et al.
(Continued)

FOREIGN PATENT DOCUMENTS

DE    10 2016 120197 A1    4/2018
WO    WO 2017/046693 A1    3/2017

OTHER PUBLICATIONS

Search Report from French Intellectual Property Office on corresponding FR application (FR1854476) dated Jan. 18, 2019.
(Continued)

*Primary Examiner* — S. Behrooz Ghorishi
(74) *Attorney, Agent, or Firm* — KOS IP Law LLP

(57) ABSTRACT

A device for shaping a blank for forming a thermoplastic structural part, the blank comprising reinforcing fibres embedded in a thermoplastic matrix, said shaping device comprising a support member for supporting a blank along a longitudinal axis, at least one heating member, at least one inclination member configured to modify the inclination of at least one part of the longitudinal portion of the blank at an angle of inclination that can be parameterised with respect to the horizontal plane in a plane transverse to the longitudinal axis, and a movement system from upstream to downstream along the longitudinal axis of the heating member and of the inclination member relative to the support member so as to successively modify the inclination of a part of each longitudinal portion of the blank.

18 Claims, 4 Drawing Sheets

(51) Int. Cl.
*B29D 99/00* (2010.01)
*B29C 70/46* (2006.01)
*B29K 101/12* (2006.01)
*B29L 31/30* (2006.01)

(52) U.S. Cl.
CPC ...... *B29C 70/465* (2013.01); *B29C 2791/001* (2013.01); *B29K 2101/12* (2013.01); *B29L 2031/3076* (2013.01)

(58) Field of Classification Search
CPC .......... B29C 2791/001; B29C 35/0272; B29C 2035/0811; B29C 2035/0822; B29C 53/043; B29C 70/24; B29C 31/004; B29K 2101/12; B29L 2031/3076; B29D 99/0003; Y02T 50/40
See application file for complete search history.

(56) References Cited

U.S. PATENT DOCUMENTS

| | | | |
|---|---|---|---|
| 4,151,031 A | 4/1979 | Goad et al. | |
| 4,402,778 A | 9/1983 | Goldsworthy | |
| 4,420,359 A | 12/1983 | Goldsworthy | |
| 4,913,910 A | 4/1990 | McCarville et al. | |
| 4,980,013 A | 12/1990 | Lowery | |
| 5,026,447 A | 6/1991 | O'Connor | |
| 5,026,514 A | 6/1991 | Hauwiller et al. | |
| 5,127,980 A | 7/1992 | Cavin | |
| 5,182,060 A | 1/1993 | Berecz | |
| 5,192,383 A | 3/1993 | Cavin | |
| 5,229,562 A | 7/1993 | Burnett et al. | |
| 5,618,486 A | 4/1997 | Yoshimi et al. | |
| 5,630,897 A | 5/1997 | Branca et al. | |
| 5,954,917 A * | 9/1999 | Jackson | B29C 70/342 156/441 |
| 6,114,012 A | 9/2000 | Amaoka et al. | |
| 6,592,795 B2 | 7/2003 | Kasai et al. | |
| 6,701,990 B1 | 3/2004 | Burley et al. | |
| 7,186,361 B2 | 3/2007 | Kasai et al. | |
| 7,670,525 B2 | 3/2010 | Weidmann et al. | |
| 7,807,005 B2 | 10/2010 | Rubin et al. | |
| 7,871,553 B2 | 1/2011 | Wilkerson et al. | |
| 8,163,221 B2 | 4/2012 | Suzuki et al. | |
| 8,333,858 B2 | 12/2012 | Rubin et al. | |
| 8,425,708 B2 | 4/2013 | Rubin et al. | |
| 8,491,745 B2 | 7/2013 | Wilkerson et al. | |
| 8,632,653 B2 | 1/2014 | Brown et al. | |
| 2005/0056362 A1* | 3/2005 | Benson | B29C 70/504 156/163 |
| 2006/0011289 A1 | 1/2006 | Suriano | |
| 2007/0175572 A1 | 8/2007 | Rubin et al. | |
| 2007/0175573 A1 | 8/2007 | Fox et al. | |
| 2008/0087371 A1 | 4/2008 | Friedrich et al. | |
| 2009/0021047 A1 | 1/2009 | Roush | |
| 2011/0206906 A1 | 8/2011 | Rubin et al. | |
| 2014/0117582 A1 | 5/2014 | Wilkerson et al. | |
| 2014/0183784 A1 | 7/2014 | Bartel et al. | |
| 2015/0053333 A1 | 2/2015 | Prebil et al. | |
| 2017/0274595 A1 | 9/2017 | Swartz et al. | |
| 2019/0274193 A1* | 9/2019 | Kaden | H05B 6/105 |

OTHER PUBLICATIONS

International Search Report and Written Opinion on corresponding PCT application (PCT/EP2019/063261) from International Searching Authority (EPO) dated Jul. 29, 2019.
Search Report from French Intellectual Property Office on corresponding FR application (FR1852432) dated Nov. 23, 2018.
Non-Final Office Action on related US application (U.S. Appl. No. 16/359,074) dated Apr. 2, 2021.
Final Office Action on related US application (U.S. Appl. No. 16/359,074) dated Nov. 16, 2021.
Non-Final Office Action on related US application (U.S. Appl. No. 16/359,074) dated Apr. 22, 2022.

* cited by examiner

DEVICE AND METHOD FOR SHAPING A BLANK FOR THE FORMATION OF A STRUCTURAL THERMOPLASTIC PART

TECHNICAL FIELD

The present invention relates to the field of the manufacture of aeronautical parts and more specifically relates to a device for shaping thermoplastic parts of large dimensions intended to form the structure of an airplane.

Large dimensions is taken to mean that one of the dimensions of the aeronautical part is greater than 1 m.

In a known manner, an airplane comprises a primary structure through which transit mechanical stresses and a secondary structure mounted on the primary structure. In this respect, the primary structure notably comprises the fuselage, delimiting the body of the airplane and defining its structural envelope, the aerofoil, comprising the two wings, making it possible to ensure the lift of the airplane in flight, and the tail assembly placed at the rear of the airplane, making it possible to ensure its stability.

The primary structure notably comprises several longerons. According to the prior art, a longeron has a U-shaped transversal section so as to have high rigidity. In a known manner, a longeron is made of a metal material, for example aluminium. However, a metal material has the drawback of being heavy, thus longerons are nowadays generally manufactured in a composite material.

In a known manner, a longeron made of composite material is produced by impregnation of reinforcing fibres in a thermosetting matrix. Such a thermosetting matrix is made rigid through polymerisation, that is to say by means of a chemical reaction during which the matrix passes from the liquid or viscous state to the solid state under the effect of heat. When the thermosetting matrix is hot it is moulded in order to obtain the desired shape, as is the case for example of U-shaped longerons, for which it is necessary to bend the two side arms. To do so, the thermosetting composite part is moulded, for example, by thermocompression in an autoclave. In a known manner, an autoclave is a hermetic enclosure in which the pressure and the temperature may be controlled and increased so as to press the composite material between a mould and a counter-mould while heating the assembly, in order to give the manufactured part its final shape. However, such an autoclave has limited dimensions, which does not enable the manufacture of parts of large dimensions such as for example longerons of an airplane wing, which have to be held in a confined enclosure. In addition, such composite parts are long to manufacture. Polymerisation is achieved by heating to between 100 and 200° C. for a duration of several hours. The manufacturing throughput is thus low.

Also, there exists a desire to replace composite parts with thermosetting matrix by composite parts with thermoplastic matrix. The manufacturing cycle of such a part is shorter but has the drawback of having to be heated to very high temperatures, being able to go up to 410° C. in order to consolidate the composite part.

To form such a part, reinforcing fibres are embedded in the thermoplastic matrix then the assembly is heated and positioned between two moulds to be shaped for example in a press, applying a high pressure to all of the moulds by means of one or more hydraulic cylinders. However, such a manufacturing method has the drawback of requiring perfect alignment of the two moulds positioned opposite each other, in order to limit the risks of deformation of the part, as well as an equivalent pressure over the entire length of the moulds, so as to compress the whole of the mould, which is complex to implement for the manufacture of parts of large dimensions. Also, manufacturing methods according to the prior art do not enable the manufacture of parts of large dimensions such as for example a one-piece longeron.

In addition, in order to form a three-dimensional part, the reinforcing fibres are draped in a three-dimensional manner by robots, which is long and costly compared to flat draping for forming a planar part. The cost becomes very high when the part to produce has large dimensions.

One of the objectives of the present invention is to propose a device for shaping a blank for the formation of a structural thermoplastic part, intended to be integrated in a primary structure of an airplane, which is simple and rapid to enable the manufacture of three-dimensional structural parts in one piece at an industrial throughput.

The document U.S. Pat. No. 4,151,031 teaches a device for continuously forming lengthened shapes from thermoplastic strips reinforced by fibres, in particular, a structural beam having an I-shape of identical section. Such a device does not make it possible to form structural parts of which the section is variable. In addition, this device teaches deforming the parts by successive passages in different tools having a single function, which prevents the easy manufacture of sections of different shapes. The documents US 2009/021047 A1, US 2007/175572 A1 and U.S. Pat. No. 2,822,575A have equivalent teachings.

SUMMARY

To this end, the invention relates to a device for shaping a blank for the formation of a structural thermoplastic part, intended to be integrated in a primary structure of an airplane, the blank comprising reinforcing fibres embedded in a thermoplastic matrix, said shaping device comprising:
a member for supporting a blank, the support member extending along a longitudinal axis,
at least one heating member configured to heat a longitudinal portion of the blank to a temperature making it possible to render the thermoplastic matrix of the blank malleable,
at least one inclination member configured to modify the inclination of at least one part of the longitudinal portion of the blank according to an angle of inclination parameterizable with respect to the horizontal plane in a plane transversal to the longitudinal axis, and
a system for displacing from upstream to downstream along the longitudinal axis the heating member and the inclination member relatively to the support member so as to modify successively the inclination of a part of each longitudinal portion of the blank.

Thanks to the invention, the shaping device makes it possible to shape in a consecutive manner each longitudinal portion of the blank. Unlike the prior art which imposed resorting to items of equipment of dimensions greater than those of the part to form, the shaping device enables a local treatment and not a global treatment. This advantageously makes it possible to shape structural parts of large dimensions. Moreover, such a device for shaping structural parts with thermoplastic matrix allows high manufacturing throughputs which could not be attained for structural parts with thermosetting matrix. The use of heating and inclination members makes it possible to give locally a three-dimensional shape to a longitudinal portion of the blank following its heating. Given that the angle of inclination is parameterizable, the deformation of the blank may be adjusted in a progressive manner, which avoids the formation of points of weakness in the blank and, consequently in the finalised structural thermoplastic part.

Preferably, the support member having a transversal section defining a horizontal upper surface and at least one side surface which is inclined with respect to said horizontal upper surface, the maximum angle of inclination corresponds to the angle formed between the side surface and the horizontal upper surface of the support member. Thus, the parameterizable inclination member makes it possible to fold back progressively a part of the blank against the side surface, the side surface making it possible to define in a precise manner the desired inclination.

In a preferred manner, each inclination member comprises at least one rolling member so as to enable a compression during its displacement by the displacement system. Thus, shaping may be carried out for a blank of long length with a same shaping device. Preferably, the rolling member extends in a plane transversal to the longitudinal axis so as to deform the transversal section of the blank.

In a preferred manner, each inclination member comprises at least one parameterizable device for modifying the angle of inclination of the rolling member. The angle of inclination may be modified in order to repeat successively the shaping operations to incline progressively a part of the blank up to the desired inclination.

According to an aspect of the invention, the shaping device comprises at least two inclination members configured to modify the inclination of two side parts of a longitudinal portion of the blank.

According to an aspect of the invention, the shaping device comprises at least one cooling member configured to cool the local portion of the blank to a temperature making it possible to solidify the thermoplastic matrix of the blank. Thus, each inclination is set in a precise manner to control the deformation and avoid any formation of a point of weakness.

In a preferred manner, the shaping device comprises at least one module comprising a frame configured to be displaced by the displacement system, the heating member and the inclination member being connected to said frame. Thus, the juxtaposition of the heating member and the inclination member makes it possible to deform in an optimal manner the blank which is at the right temperature. In an advantageous manner, thanks to the parameterizable inclination member, the frame may be displaced in a practical manner to deform in a parameterizable manner the blank and to obtain a complex shape of which the section is variable along its length. Such a frame is adaptable to different types of parts.

In a preferred manner, the heating member has a section hollowed out towards the support member so as to enable uniform heating of a local portion of the blank in the course of being shaped. In a preferred manner, the shape of the heating member is parameterizable to adapt to progressive deformations of the blank.

Preferably, the shaping device comprises at least one downstream pressing member configured to press the local portion of the blank against the support member, the downstream pressing member being situated downstream of the heating member. Thus, the blank is immobilised to carry out a precise deformation.

Further preferably, the shaping device comprises at least one upstream pressing member configured to press the local portion of the blank against the support member, the upstream pressing member being situated upstream of the heating member. Thus, a longitudinal portion of the blank is immobilised to produce a precise deformation, any undesirable deformation being avoided.

The invention also relates to a method for shaping a structural thermoplastic part, intended to be integrated in a primary structure of an airplane, the blank comprising reinforcing fibres embedded in a thermoplastic matrix, the blank being shaped by a shaping device such as described previously, the blank being supported on the support member, the method comprises:
  a step of heating a local portion of the blank to a temperature making it possible to melt the thermoplastic matrix of the blank then
  a step of modifying the inclination of at least one part of the longitudinal portion of the blank according to a defined angle of inclination with respect to the horizontal plane in a plane transversal to the longitudinal axis, and
  a step of displacing from upstream to downstream along the longitudinal axis the heating member and the inclination member relatively to the support member so as to modify successively the inclination of a part of each longitudinal portion of the blank according to the angle of inclination.

In a preferred manner, the method comprises a repetition of the steps of heating, modification of the inclination and displacement, the angle of inclination being increased at each repetition. A progressive deformation makes it possible to limit the appearance of weakness zones along the longitudinal direction but also along the lateral direction. The mechanical properties of the reinforcing fibres are preserved.

According to a preferred aspect, the support member having a transversal section defining a horizontal upper surface and at least one side surface which is inclined with respect to said horizontal upper surface, the blank is supported on the horizontal upper surface and a part of the blank is inclined progressively up to being pressed against the side surface.

Preferably, the blank is planar and is shaped by the method. Such a planar blank is simple, not very expensive and quick to form. Thanks to the invention, three-dimensional blanks may be obtained at an industrial throughput.

In a preferred manner, each local portion of the blank is successively heated, deformed by inclination and cooled. Thus, each elementary deformation is controlled in a precise manner.

BRIEF DESCRIPTION OF THE DRAWINGS

The invention will be better understood on reading the description that follows, given uniquely as an example, and by referring to the appended drawings in which.

It should be noted that the figures set out the invention in a detailed manner for implementing the invention, said figures obviously being able to serve to better define the invention if need be.

DETAILED DESCRIPTION

In a known manner, a structural thermoplastic part, intended to be integrated in a primary structure of an airplane, is formed from a blank comprising reinforcing fibres embedded in a thermoplastic matrix. As indicated previously, in order to obtain a finished part, the blank has to be heated to a temperature above the melting temperature of the thermoplastic matrix while being compressed in order to increase its density and to make it rigid. As an example, the reinforcing fibres are made of carbon and the matrix is PEEK or PEKK. A blank 1 is not consolidated and is porous.

In this example, the blank 1 is produced by flat draping of reinforcing fibres pre-impregnated with PEEK or PEKK matrix. Such a draping method is faster and less expensive than three-dimensional draping. After draping, the blank 1 is planar and rigid. The blank 1 is not consolidated.

Figure 1:
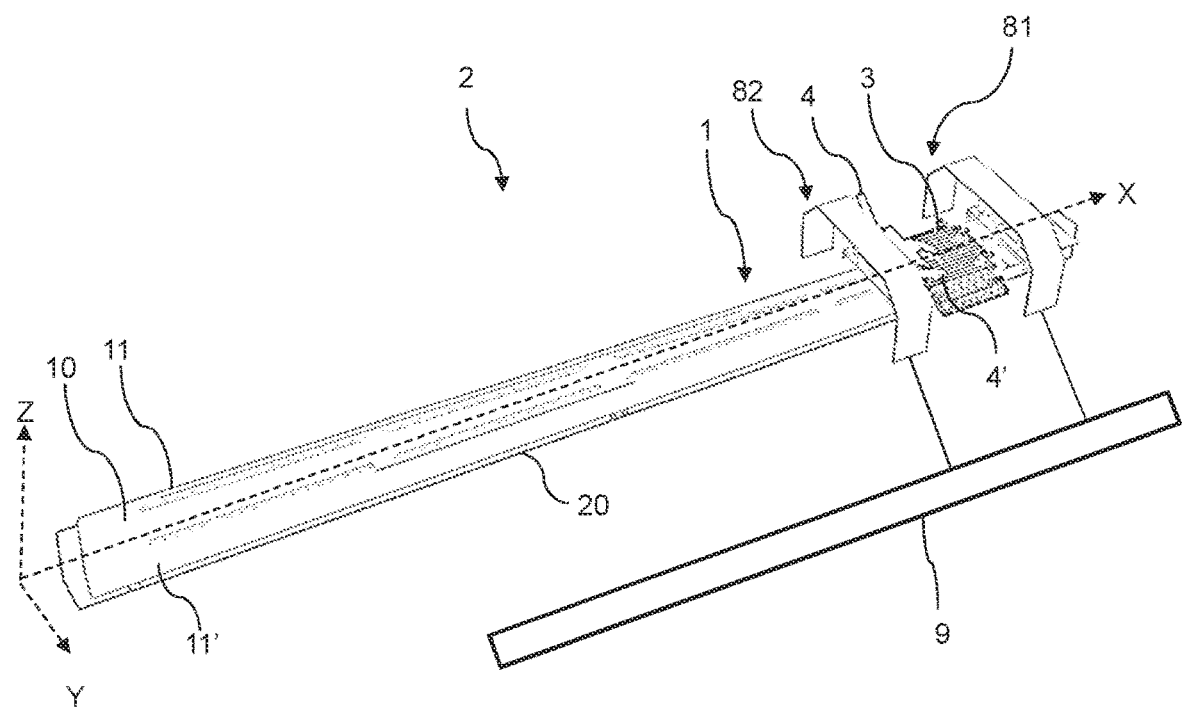
FIG. 1 is a schematic perspective representation of a shaping device according to an embodiment of the invention.

As an example, with reference to FIG. 1, a blank 1 which extends longitudinally along an X axis over a length greater than 1 m, preferably greater than 5 m, is represented. In this example, the width of the blank 1 varies along the longitudinal axis. Thanks to the shaping device 2 according to the invention, with reference to FIG. 3, the planar blank 1 is going to be shaped to have a U-shaped section so as to define a horizontal base 10 and two side arms 11, 11' (a left side arm 11 and a right side arm 11'). In this example, the side arms 11, 11' are orthogonal to the horizontal base 10 but it goes without saying that their inclination could be different. Similarly, it goes without saying that the blank 1 could only comprise a single side arm 11, 11'.

Figure 2:
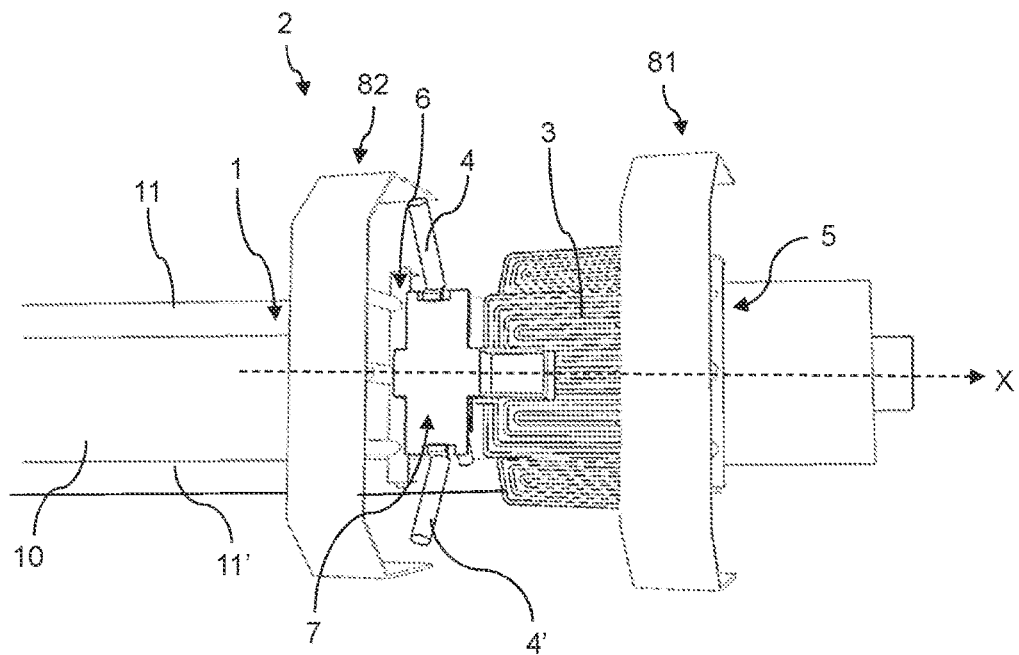
FIG. 2 is a schematic top representation of the shaping device of FIG. 1.

With reference to FIGS. 1 and 2, a device for shaping 2 a blank 1 according to an embodiment of the invention is represented schematically.

In this example, the shaping device 2 comprises a member for supporting 20 a blank 1 which extends from upstream to downstream along the X axis, a heating member 3, two inclination members 4, 4' and a system for displacing 9 from upstream to downstream along the longitudinal X axis the heating member 3 and inclination members 4, 4' relatively to the support member 20 so as to modify successively the inclination of a part of each longitudinal portion of the blank 1.

With reference to FIG. 1, the support member 20 extends along a longitudinal X axis so as to support the blank 1 along its length. The support member 20 has an upper surface of shape adapted to the finished shape of the structural thermoplastic part. In this example, the support member 20 has a support surface having an inverted U section. The section of the support surface varies according to the length of the support member 20 in order to obtain the desired shape of the structural thermoplastic part. In this example, with reference to FIG. 3, the transversal section defines a horizontal upper surface 22 and two side surfaces 21, 21' which are inclined with respect to said horizontal upper surface 22. In this example, the side surfaces 21, 21' are orthogonal to the horizontal upper surface 22. It goes without saying that the inclination of the side surfaces 21,21' could be different as a function of the desired type of shaping.

Hereafter, the shaping device 2 is defined in an orthogonal reference system X, Y, Z in which the X axis extends longitudinally from upstream to downstream, the Y axis extends laterally from the left to the right and the Z axis extends vertically from the bottom to the top.

In order to enable optimal shaping of the blank 1 by the shaping device 2, the support member 20 has a rigid structure, in particular, made of metal material in order not to deform during the manufacture. The support member 20 is also called anvil. In this example, the support member 20 has a length greater than 2 m. To facilitate handling, the support member 20 has a length greater than that of the blank 1.

Figure 5:
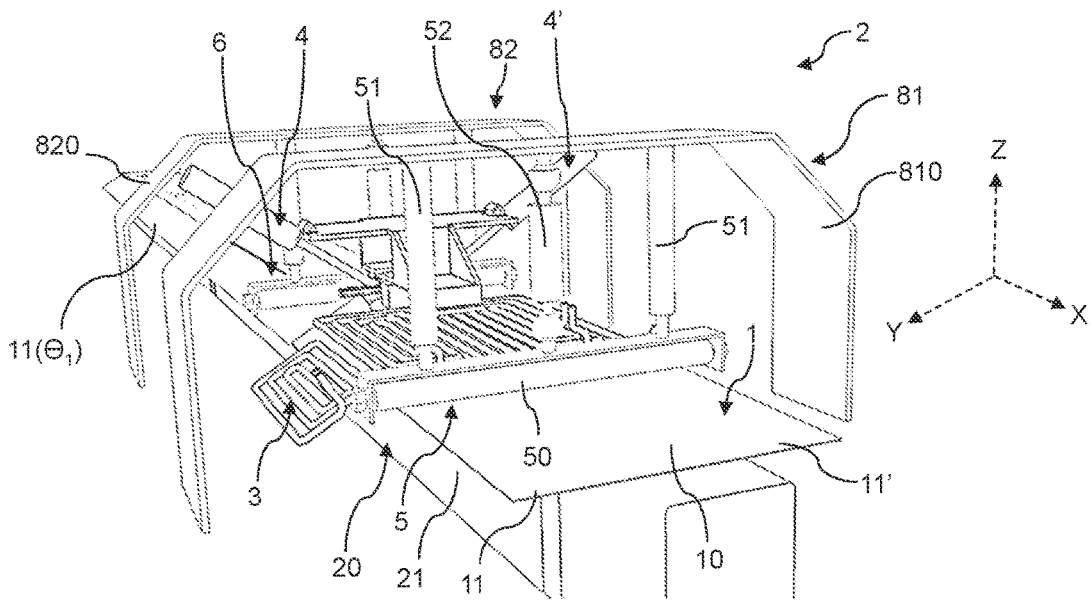
FIG. 5 is a schematic representation of the shaping device of FIG. 1 from downstream.

With reference to FIGS. 2 and 5, the heating member 3 is configured to heat a local portion of the blank 1 to a temperature making it possible to melt the thermoplastic matrix of the blank 1. In particular, the heating member 3 makes it possible to heat to a temperature above 360° C./380° C. to reach the melting temperature of the thermoplastic matrix of the blank 1.

The heating member 3 is configured to produce heating by induction by circulating a current in a metal element or directly in the reinforcing fibres, but it goes without saying that other heating technologies could be suitable, in particular, by infrared or resistive. In this example, the heating member 3 makes it possible to induce a current in the reinforcing fibres of the blank 1.

As illustrated in FIG. 5, the heating member 3 has a section hollowed out towards the support member 20 so as to enable uniform heating of a local portion of the blank 1 in the course of being shaped. Thus, the base 10 and the side arms 11, 11' of the blank 1 may be heated homogeneously. The heating member 3 comprises an upper wall and two side walls, each comprising magnetic coils. According to a preferred aspect of the invention, the inclination of the side walls of the heating member is adjustable, in this example, over an angular range of 90°. Thus, when a longitudinal portion of the blank 1 is situated in the cavity of the heating member 1, the longitudinal portion is heated locally to high temperature and becomes malleable, which enables modification of the inclination of the side arms 11, 11' of the blank 1 by the inclination members 4, 4' as will be described hereafter.

It goes without saying that the structure of the heating member 3 could be different as a function of the heating technology employed, for example, resistive or infrared.

In a preferred manner, the heating member 3 may be coupled to one or more members for measuring the temperature in order to control the temperature during manufacture.

As illustrated in FIG. 2, the shaping device 2 comprises a left inclination member 4 and a right inclination member 4' which are respectively configured to modify the inclination of the left side arm 11 and the right side arm 11' of the blank 1 according to an angle of inclination θ, θ' determined with respect to the horizontal plane into which the base 10 of the blank 1 extends.

In this example, the inclination members 4, 4' are configured to fold back the side arms 11, 11' of the blank 1 against the side surfaces 21, 21' of the support member 20. The maximum desired angle of inclination is 90°, which corresponds to the angle formed between each side surface 21, 21' and the horizontal upper surface 22 of the support member 20. It goes without saying that the angles of inclination θ, θ' of the inclination members 4, 4' could be different as a function of the desired shaping.

The inclination members 4, 4' are all oriented in a plane transversal to the X axis so as to deform successively each longitudinal portion during the relative displacement with respect to the support member 20.

Figure 4:
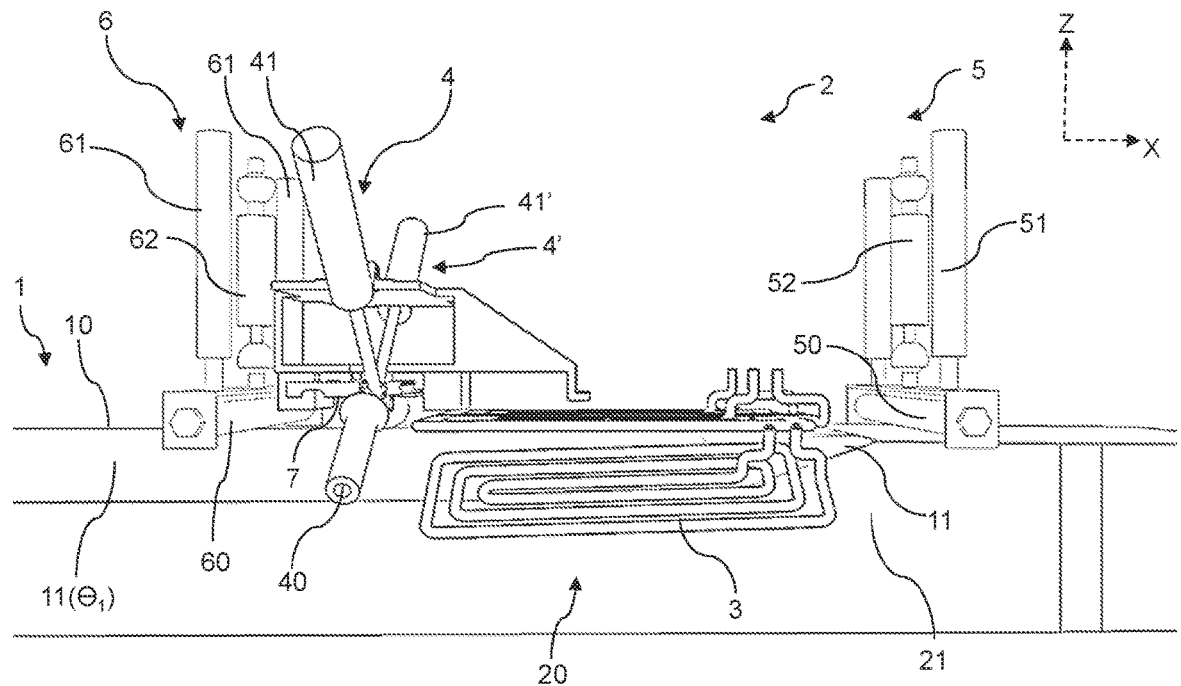
FIG. 4 is a schematic side representation of the shaping device of FIG. 1.

In this example, with reference to FIG. 4, each inclination member 4, 4' comprises a rolling member 40, 40' extending in a plane transversal to the longitudinal X axis and a parameterizable device for modifying 41, 41' the angle of inclination θ, θ' of the rolling member 40, 40' to press the rolling member 40, 40' onto the blank 1 while adjusting the angle of inclination θ, θ' determined with respect to the horizontal plane. Rolling member 40' is hidden from view in the perspective view shown.

In a preferred manner, the rolling member 40, 40' is in the form of a roller. The parameterizable modification device 41, 41' is configured to incline gradually the rolling member 40, 40'. Each inclination member 4, 4' is configured to exert an oblique compression along an oblique axis with respect to the Y and Z axes. In this example, the parameterizable modification device 41, 41' is in the form of cylinder with a pivot system or an angular variator (electric, hydraulic or pneumatic). Each inclination member 4, 4' can deform the blank 1 while being displaced longitudinally along the longitudinal X axis on the blank 1.

As illustrated in FIG. 4, the shaping device 2 comprises a downstream pressing member 5 and an upstream pressing member 6 in order to immobilise the blank 1 when the portion of the blank 1, situated between the downstream pressing member 5 and the upstream pressing member 6, is deformed by the inclination members 4, 4'.

The pressing members 5, 6 are all oriented in a plane transversal to the X axis so as to compress successively each longitudinal portion.

In this example, each pressing member 5, 6 comprises a rolling member 50, 60, a pressing member 52, 62 to press the rolling member 50, 60 onto the blank 1 and several members for guiding 51, 61 the rolling member 52, 62. In a preferred manner, the rolling member 50, 60 is in the form of a roller and the pressing member 52, 62 is in the form of a pressure cylinder. The guiding members 51, 61 are for their part in the form of slides so as to allow a displacement of the rolling member 50, 60 uniquely in translation along the axis of the pressing member 50, 60 without turning around said axis. Thus, each pressing member 5, 6 can press the blank 1 while being displaced longitudinally along the X axis on the blank 1. Each pressing member 5, 6 carries out a pressing in a plane transversal to the longitudinal X axis so as to press successively each longitudinal portion of the blank 1.

With reference to FIG. 4, the pressing members 5, 6 are configured to produce a vertical pressing of the blank 1 against the support member 20, in particular, against its upper surface 22. In a preferred manner, the vertical pressing force is comprised between 14 and 300 psi.

The compressive force of each pressing member 5, 6 and each inclination member 4, 4' may advantageously be adjusted in an individual manner.

Optionally, with reference to FIG. 4, the shaping device 2 comprises a cooling member 7 configured to cool a local portion of the blank 1. In particular, the cooling member 7 makes it possible to cool the longitudinal portion to a temperature below the glass transition temperature of the thermoplastic matrix of the blank 1 so that it becomes rigid again in order to fix its dimensions. In this example, the cooling member 7 is configured to carry out cooling by blowing of air. It goes without saying that other cooling technologies could be suitable, in particular, a compression system by refrigerated rollers.

The cooling member 7 is in the form of an air discharge pipe oriented vertically downwards so as to cool the base 10 of the blank 1 as well as the side arms 11, 11' of the blank 1 of which the inclination has been modified. Thus, when a longitudinal portion of the blank 1 is situated under the cooling member 7, it is cooled locally so as to make it rigid and set its structure.

According to the invention, with reference to FIG. 1, the shaping device 2 comprises a system for displacing 9 the heating member 3, inclination members 4, 4', pressing members 5, 6 and cooling member 7 along the longitudinal X axis of the support member 20. In this example, the displacement system 9 comprises different displacement members (wheels, rail, etc.) to displace the members along the longitudinal X axis with respect to the support member 20. However, it goes without saying that other means could be suitable, notably, an overhead displacement gantry. The displacement system 9 may be fixed to the ground or at height.

In an embodiment not represented, the displacement system 9 could be configured to displace the support member 20 whereas the heating member 3, the inclination members 4, 4', the pressing members 5, 6 and the cooling member 7 remain fixed. Only a relative movement must be carried out to enable the consecutive deformation of each longitudinal portion.

In this exemplary embodiment, the different members are grouped together into several modules.

Figure 6:
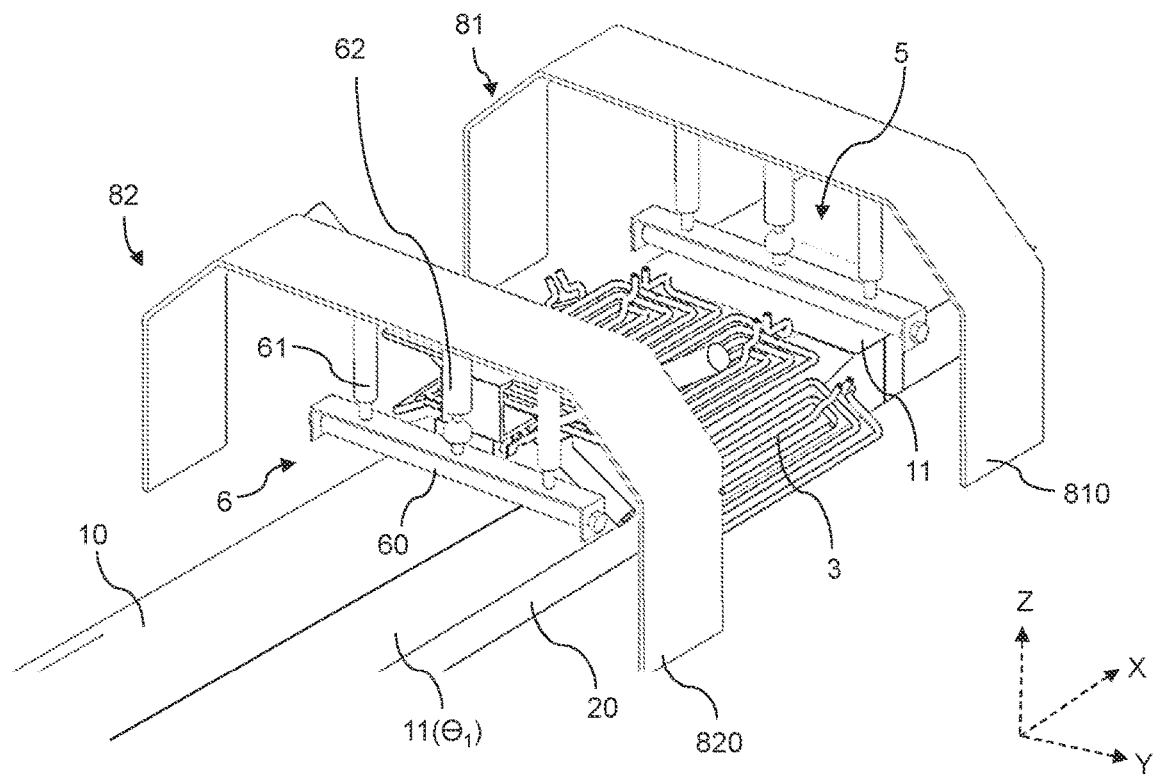
FIG. 6 is a schematic representation of the shaping device of FIG. 1 from upstream.

With reference to FIGS. 5 to 6, the shaping device 2 comprises a downstream module 81 and an upstream module 82 which are displaced by the displacement system 9 with respect to the support member 20. It goes without saying that the displacement system 9 could also displace the support member 20 in order to create a relative movement.

The downstream module 81 comprises a frame 810 which has an inverted U-shape defining a concavity in which is mounted the downstream pressing member 5. The downstream pressing member 5 comprises a rolling member 50, a pressing member 52 connecting the rolling member 50 to the frame 810 and two guiding members 51 connecting the rolling member 50 to the frame 810, in particular, on either side of the pressing member 52. As indicated previously, each rolling member 50 is in the form of a roller, each pressing member 52 is in the form of a cylinder and each guiding member 51 is in the form of a slide.

The frame 810 of the downstream module 81 is connected to the displacement system 9 in order to enable the displacement of the downstream module 81 along the longitudinal direction X. During the longitudinal displacement along the X axis, the base 10 of the blank 1 is forced by the downstream pressing member 5 against the support member 20, which makes it possible to immobilise it.

The upstream module 82 comprises a frame 820 which has an inverted U-shape defining a concavity in which are mounted, from downstream to upstream, the heating member 3, the inclination members 4, 4', the cooling member 7 and the upstream pressing member 6.

In an analogous manner to the downstream pressing member 5, the upstream pressing member 6 comprises a rolling member 60, a pressing member 62 connecting the rolling member 60 to the frame 820 and two guiding members 61 connecting the rolling member 60 to the frame 820, in particular, on either side of the pressing member 62. As indicated previously, each rolling member 60 is in the form of a roller, each pressing member 62 is in the form of a cylinder and each guiding member 61 is in the form of a slide.

In an analogous manner to previously, the frame 820 of the upstream module 82 is connected to the displacement system 9 in order to enable the displacement of the upstream module 82 along the longitudinal direction X. During the longitudinal displacement along the X axis, a local portion of the blank 1 is heated by the heating member 3 to a temperature above the melting temperature of the thermoplastic matrix so as to render the blank 1 malleable then directly stressed by the inclination members 4, 4' in order to fold back in a progressive manner the side arms 11, 11' of the blank 1 without inducing weaknesses in the blank 1. After deformation, the blank 1 is cooled to a temperature below the glass transition temperature of the thermoplastic matrix in order to fix the deformation obtained. The deformation is controlled in an optimal manner while avoiding any undesired deformation. The upstream pressing member 6 makes it possible, in the same way as the downstream pressing member 5, to immobilise the longitudinal portion which is deformed.

An exemplary embodiment of a method for shaping a structural thermoplastic part, intended to be integrated in a primary structure of an airplane, will henceforth be described.

Figure 3:
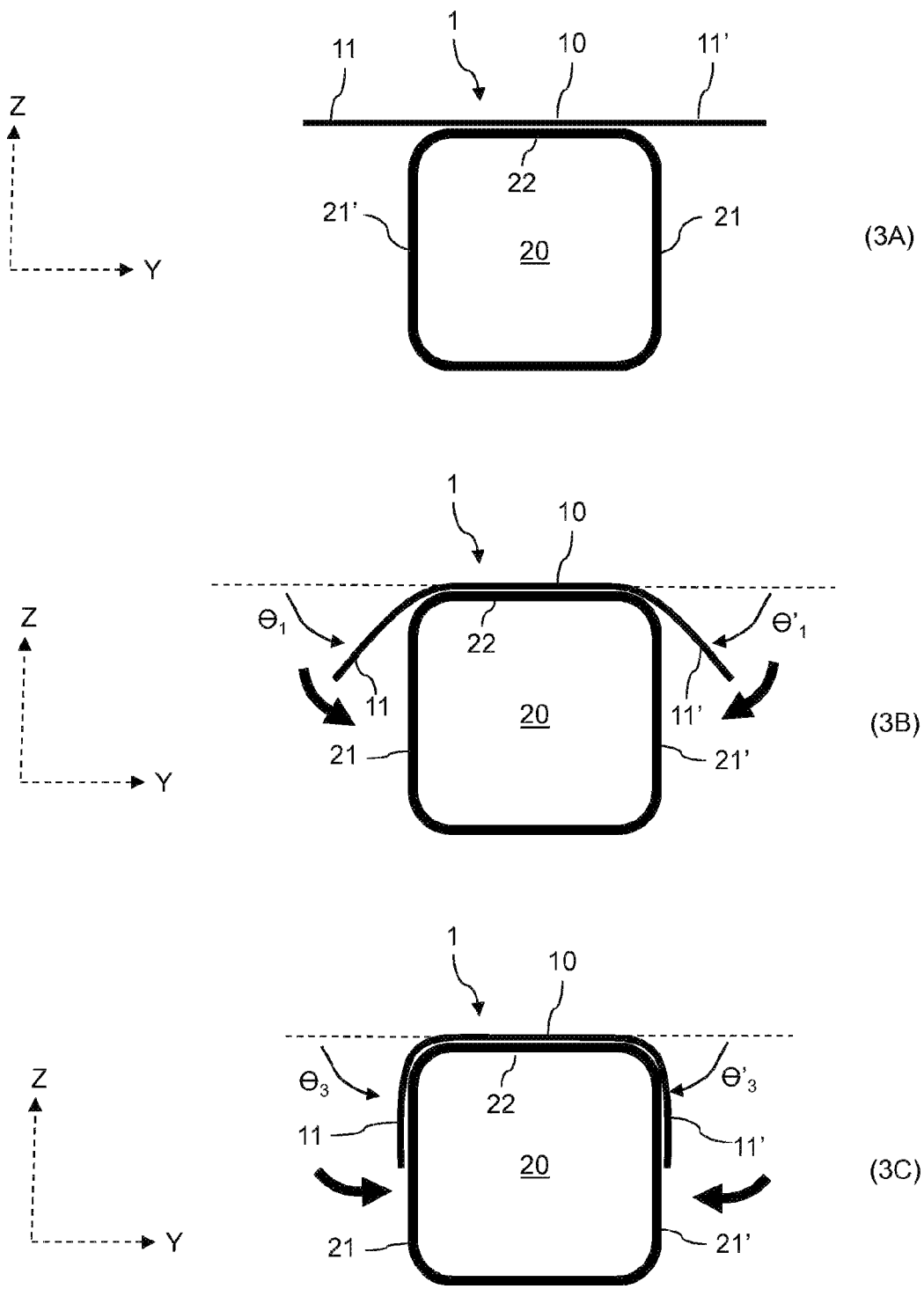
FIG. 3 is a schematic representation in transversal section of a progressive deformation of the side arms of the blank.

The blank 1 comprises reinforcing fibres embedded in a thermoplastic matrix. The blank 1 is planar and is supported on the support member 20, in particular, on the upper surface 22 as illustrated in FIG. 3. The blank 1 is not consolidated and has been produced by flat draping.

Figure 7:
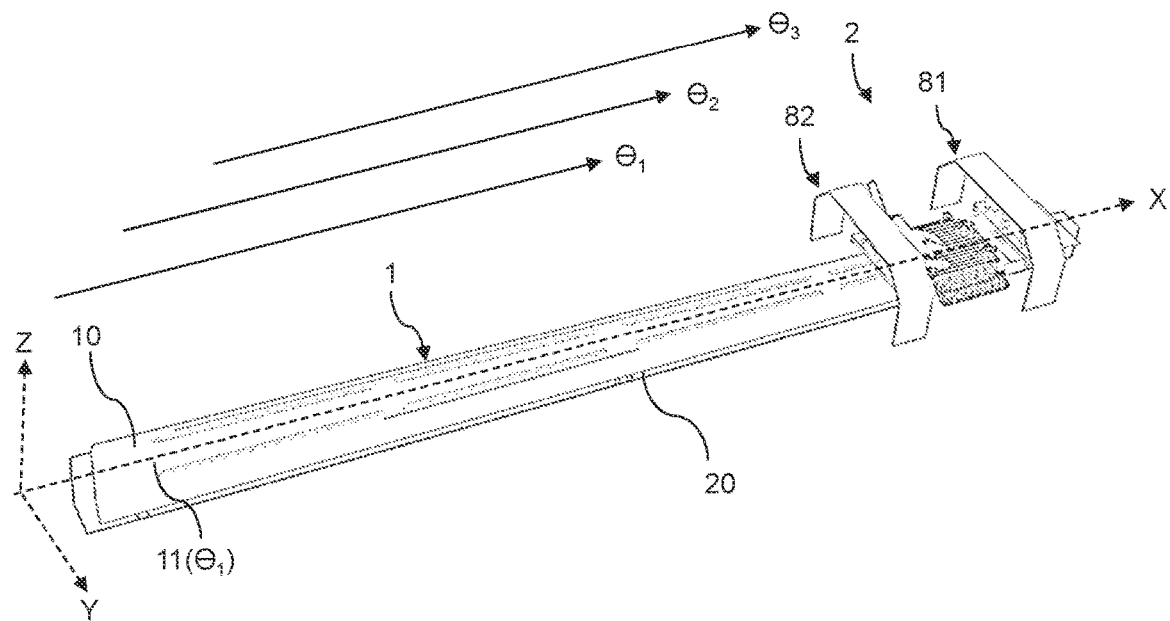
FIG. 7 is a schematic representation of the steps of displacement of the inclination members in the course of being shaped.

With reference to FIG. 7, the modules 81, 82 of the shaping device 2, situated upstream of the blank 1, are displaced in a continuous or sequential manner from upstream to downstream by the displacement system 9 (not represented in these figures).

Each longitudinal portion of the blank 1 is treated consecutively by the downstream module 81 and the upstream module 82. The downstream module 81 presses in a preliminary manner the blank 1 as a whole in order to prepare it for heating. The blank 1 is thus immobilised.

Then, the heating member 3 of the upstream module 82 heats the local portion of the blank 1 to a temperature above the melting temperature of the thermoplastic matrix (temperature of the order of 360° C.-380° C.) in order to soften the blank 1.

Next, the inclination members 4, 4' modify respectively the inclination of the side arms 11, 11' of the heated longitudinal portion of the blank 1 according to a first angle of inclination $\theta_1$ defined with respect to the horizontal plane in a plane transversal to the longitudinal X axis. The first angle of inclination $\theta_1$ is less than an angular threshold, here of value 15°, so as not to induce weaknesses at the junction of the base 10 and the side arms 11, 11' of the blank 1. The angular deformation threshold further makes it possible to limit any weakness between two successive longitudinal portions of the blank 1. In the course of the method, the side arms 11, 11' are further away from the side surfaces 21, 21' of the support member 20 upstream of the inclination members 4, 4' than downstream. Thus, the inclination is progressive, which makes it possible to benefit from the thermoplastic matrix which may be rendered malleable in a repeated manner without affecting the mechanical properties of the blank 1. The integrity of the reinforcing fibres is preserved.

The integration of the inclination members 4, 4' and a heating member 3 in a same upstream module 82 advantageously enables the inclination members 4, 4' to deform in an optimal manner the blank 1 which has been rendered malleable. The steps of heating and deformation are directly sequenced together, the thermoplastic matrix not having the time to cool to a temperature below the glass transition temperature of the thermoplastic matrix. In other words, the upstream module 82 makes it possible to modify progressively the inclination of the side arms 11, 11'.

The cooling member 7 makes it possible to cool the local portion by setting the thermoplastic matrix, said matrix being cooled to a temperature below the glass transition temperature of the thermoplastic matrix. In an analogous manner to the downstream pressing member 5, the upstream pressing member 6 compresses and presses the blank 1 in order to give it its final shape. Any undesired folding or torsion of the blank 1 is thus avoided. Thus, each local portion of the blank 1 is successively heated, deformed and cooled.

As illustrated in FIG. 7, the method comprises a repetition of the steps of heating, modification of the inclination and displacement in order to deform in a progressive manner the side arms 11, 11' of the blank 1. The angle of inclination $\theta$ is incremented at each repetition 01, 02, 03. In a preferred manner, the angular increment is less than the angular threshold in order not to induce weaknesses in the blank 1. The modules 81, 82 thus make several back and forth movements on the support member 20.

In this example, the side arms 11, 11' are inclined progressively up to being pressed against the side surfaces 21, 21' of the support part 20. In a preferred manner, between 3 and 5 repetitions are necessary to obtain the desired U-shape. Such a shaping method is thus rapid to implement.

Moreover, thanks to the invention, each longitudinal portion of the blank 1 may be shaped in a local manner. This is particularly advantageous for the manufacture of parts of large dimensions, it is not necessary to provide an equipment having dimensions greater than the part to manufacture. There thus no long exist constraints linked to the dimensions of the part to shape.

The invention applies to different structural parts and has an important interest for those of large dimensions, that is to say, having at least one dimension greater than 1 m and, preferably, greater than 5 m.

Once the blank 1 shaped in a three-dimensional manner, it may be consolidated in order to decrease its porosity, in particular, by means of a device such as described in the patent application FR1852432 of the Applicant. The use of a shaping device and a manufacturing device has synergic effects to reach industrial production throughputs for the manufacture of structural thermoplastic parts.

The invention claimed is:

1. A shaping device for shaping a blank of a structural thermoplastic part for integrating into a primary structure of an airplane, the blank comprising reinforcing fibres fibers embedded in a thermoplastic matrix, said shaping device comprising:
   a support member for supporting the blank when the blank is placed thereon, the support member extending along a longitudinal axis;
   a heating member configured to heat a longitudinal portion of the blank to a temperature sufficient to render the thermoplastic matrix of the blank malleable, the heating member comprising an upper wall and two sidewalls defining a cavity oriented towards the support member, each of said two sidewalls being oriented at an angle of inclination relative to the upper wall;

an inclination member sized and shaped to modify an inclination of at least one part of the longitudinal portion of the blank according to an angle of inclination of the inclination member, the angle of inclination of the inclination member being adjustable with respect to a horizontal plane transverse to the longitudinal axis from a first angle relative to the horizontal plane at time1 to a second angle relative to the horizontal plane at time2 and to a third angle relative to the horizontal plane at time3, and wherein time1, time2, and time3 are representative of different moments in time of the shaping device to successively shape the structural thermoplastic part;

at least one module comprising a frame, the heating member and the inclination member being connected to the frame; and a displacement system for displacing the frame so as to modify successively the inclination of the at least one part of the longitudinal portion of the blank.

2. The shaping device according to claim 1, wherein the inclination member comprises a rolling member configured to compress the blank during displacement of the displacement system.

3. The shaping device according to claim 2, wherein the rolling member extends along the horizontal plane.

4. The shaping device according to claim 2, wherein the inclination member is attached to at least one parameterizable device, said parameterizable device being sized and shaped to modify the angle of inclination of the rolling member.

5. The shaping device according to claim 1, wherein the inclination member is a first inclination member and further comprising a second inclination member, and wherein the first and the second inclination members are configured to modify inclinations of two side parts of the longitudinal portion of the blank.

6. The shaping device according to claim 1, further comprising a cooling member configured to cool the blank to solidify the thermoplastic matrix of the blank.

7. The shaping device of claim 1, wherein the angle of inclination of the two sidewalls of the heating member being adjustable to vary the angle of inclination of the two sidewalls relative to the upper wall of the heating member.

8. A shaping device for shaping a blank, said shaping device comprising:
a support member having a surface defining a plane and a longitudinal axis, the support member is configured for supporting a blank for use as a structural thermoplastic part;
a heating member having a heat source for heating the blank;
a first module comprising a frame and a roller connected to a first pressing member located at a first end of the heating member;
a second module comprising a frame and a roller connected to a second pressing member located at a second end of the heating member, said second module further comprising an inclination member attached to an adjustable cylinder for incrementally changing an angle of inclination of the inclination member from a first angle relative to the plane of the support member to a second angle relative to the plane of the support member and to a third angle relative to the plane of the support member, the inclination member is configured to adjust an inclination of at least one portion of the blank from a first blank angle to a second blank angle and to a third blank angle when the inclination member is adjusted from the first angle relative to the plane to the second angle relative to the plane and to the third angle relative to the plane during operation of the shaping device to shape the structural thermoplastic part from a starting shape to a final shape; and
a displacement system connected to the frame of the first module, the heating member, and the frame of the second module for moving the two frames and the heating member relative to the support member.

9. The shaping device of claim 8, wherein the heating member comprises an upper wall and two sidewalls defining a cavity oriented towards the support member, each of said two sidewalls being oriented at an angle of inclination relative to the upper wall and the angle of inclination of the two sidewalls of the heating member being adjustable from a first angle of inclination to a second angle of inclination that differs from the first angle of inclination.

10. The shaping device of claim 8, wherein the adjustable cylinder is a first adjustable cylinder and wherein the second module comprises a second inclination member attached to a second adjustable cylinder for changing an angle of inclination of the second inclination member from a first angle relative to the plane of the support member to a second angle relative to the plane of the support member and to a third angle relative to the plane of the support member.

11. The shaping device of claim 8, further comprising a guiding member attached to the roller of the first module.

12. The shaping device of claim 11, further comprising a guiding member attached to the roller of the second module.

13. The shaping device of claim 12, wherein the inclination member is a roller.

14. The shaping device of claim 13, wherein the support member has a first side surface extending at an angle to the surface and a second side surface extending at an angle to the surface.

15. A method for shaping a blank, usable as a structural thermoplastic part to be integrated in a primary structure of an airplane, the blank comprising reinforcing fibers embedded in a thermoplastic matrix, the method comprising the steps:
placing the blank on a support member, the support member extending along a longitudinal axis;
heating a local portion of the blank to a temperature making it possible to melt the thermoplastic matrix of the blank, the blank comprising a longitudinal portion located on the support member; the heating member comprising an upper wall and two sidewalls defining a cavity oriented towards the support member, each of said two sidewalls being oriented at an angle of inclination relative to the upper wall;
modifying an inclination of at least one part of the longitudinal portion of the blank with an inclination member according to an angle of inclination of the inclination member, said angle of inclination defined with respect to a horizontal plane transverse to a longitudinal axis to successively change the angle of inclination during the modifying step from a first angle relative to the horizontal plane at time1 to a second angle relative to the horizontal plane at time2, and to a third angle relative to the horizontal plane at time3, and wherein time1, time2, and time3 are representative of different moments in time; and
displacing the heating member and the inclination member relative to the support member to modify the inclination of the at least one part of the longitudinal portion of the blank according to the angle of inclination of the inclination member.

16. The method for shaping according to claim 15, further comprising adjusting the angle of inclination of the inclination member and repeat the displacing method to displace the inclination member to change the inclination of the at least one part of the longitudinal portion of the blank.

17. The method for shaping according to claim 15, wherein the support member has a transverse section defining a horizontal upper surface and at least one side surface that is inclined relative to the horizontal upper surface, and wherein the blank is supported on the horizontal upper surface and a part of the blank is progressively inclined up to being pressed against the at least one side surface of the support member.

18. The method for shaping according to claim 15, wherein the angle of inclination of the two sidewalls of the heating member being adjustable to vary the angle of inclination of the two sidewalls relative to the upper wall of the heating member.

\* \* \* \* \*